United States Patent
Tam

(10) Patent No.: US 9,443,432 B2
(45) Date of Patent: Sep. 13, 2016

(54) VEHICLE ASSOCIATION WITH DRIVER USING MOBILE TECHNOLOGIES

(71) Applicant: Trimble Navigation Limited, Sunnyvale, CA (US)

(72) Inventor: Joyce Tam, Milpitas, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 16 days.

(21) Appl. No.: 13/673,092

(22) Filed: Nov. 9, 2012

(65) Prior Publication Data
US 2014/0136012 A1   May 15, 2014

(51) Int. Cl.

| | |
|---|---|
| *G07C 5/00* | (2006.01) |
| *G06F 17/00* | (2006.01) |
| *G08G 1/00* | (2006.01) |
| *H04W 12/06* | (2009.01) |
| *H04W 4/02* | (2009.01) |
| *H04W 4/04* | (2009.01) |
| *H04L 29/08* | (2006.01) |
| *G07C 5/08* | (2006.01) |
| *G07C 5/02* | (2006.01) |
| *G01S 19/42* | (2010.01) |
| *H04L 29/06* | (2006.01) |
| *H04W 88/02* | (2009.01) |

(52) U.S. Cl.
CPC ................ *G08G 1/20* (2013.01); *G06F 17/00* (2013.01); *H04L 67/12* (2013.01); *H04L 67/125* (2013.01); *H04L 67/18* (2013.01); *H04L 67/22* (2013.01); *H04W 4/028* (2013.01); *H04W 4/046* (2013.01); *H04W 12/06* (2013.01); *G01S 19/42* (2013.01); *G07C 5/00* (2013.01); *G07C 5/008* (2013.01); *G07C 5/02* (2013.01); *G07C 5/08* (2013.01); *G07C 5/0841* (2013.01); *H04L 63/0861* (2013.01); *H04W 88/02* (2013.01)

(58) Field of Classification Search
CPC ..... G06F 17/00; H04W 4/028; H04W 4/046; H04W 12/06; H04W 88/02; G08G 1/20; H04L 67/12; G07C 5/00; G07C 5/08; G07C 5/008; G07C 5/02; G07C 5/0841
USPC ........... 701/1, 24, 36, 70; 340/4.6, 5.8–5.86, 340/426.11; 307/9.1–10.5; 705/7.12–7.16, 705/7.38–7.42, 34; 382/105; 726/4
See application file for complete search history.

(56) References Cited

U.S. PATENT DOCUMENTS

| | | | |
|---|---|---|---|
| 5,519,260 A * | 5/1996 | Washington | ................. 307/10.5 |
| 7,174,171 B2 | 2/2007 | Jones | |
| 7,610,120 B2 * | 10/2009 | Christensen | ..................... 701/1 |
| 7,656,271 B2 | 2/2010 | Ehrman et al. | |
| 8,115,656 B2 | 2/2012 | Bevacqua et al. | |

(Continued)

OTHER PUBLICATIONS

"PCT/2013/069010 Search Report", Feb. 27, 2014, 14 pages.

*Primary Examiner* — Thomas Tarcza
*Assistant Examiner* — Tyler J Lee
(74) *Attorney, Agent, or Firm* — Kilpatrick Townsend Stockton LLP

(57) ABSTRACT

An improved method for asset management is described. The method includes receiving information from a remote reporting device in close proximity to an asset, the information including a first unique identifier associated with the asset and a second unique identifier associated with a user of the asset. The method further includes associating the asset with the user based on the information. Additionally, the method includes monitoring use of the asset and maintaining a record of the use by the user based on the information.

25 Claims, 11 Drawing Sheets

(56) References Cited

U.S. PATENT DOCUMENTS

| | | | |
|---|---|---|---|
| 8,280,791 B2 | 10/2012 | Davis, III et al. | |
| 8,344,879 B2 | 1/2013 | Harmon et al. | |
| 8,522,320 B2* | 8/2013 | Kleve et al. | 726/4 |
| 8,626,568 B2 | 1/2014 | Warkentin et al. | |
| 8,738,389 B2 | 5/2014 | Hjelm et al. | |
| 8,903,593 B1* | 12/2014 | Addepalli et al. | 701/29.1 |
| 2002/0186144 A1* | 12/2002 | Meunier | 340/825.28 |
| 2003/0079135 A1 | 4/2003 | Jones | |
| 2003/0225707 A1 | 12/2003 | Ehrman et al. | |
| 2004/0204796 A1* | 10/2004 | Harvey et al. | 701/1 |
| 2004/0232228 A1 | 11/2004 | Gotfried et al. | |
| 2006/0069609 A1 | 3/2006 | Chiou | |
| 2009/0079555 A1* | 3/2009 | Aguirre De Carcer et al. | 340/441 |
| 2009/0306834 A1* | 12/2009 | Hjelm et al. | 701/1 |
| 2009/0309709 A1* | 12/2009 | Bevacqua et al. | 340/426.18 |
| 2010/0265061 A1* | 10/2010 | Harmon et al. | 340/539.13 |
| 2011/0010300 A1* | 1/2011 | Audet | 705/307 |
| 2011/0093136 A1* | 4/2011 | Moinzadeh et al. | 701/2 |
| 2011/0112969 A1* | 5/2011 | Zaid et al. | 705/50 |
| 2011/0137773 A1* | 6/2011 | Davis et al. | 705/34 |
| 2011/0161138 A1* | 6/2011 | Keaveny et al. | 705/7.38 |
| 2011/0184784 A1* | 7/2011 | Rudow et al. | 705/7.38 |
| 2011/0213629 A1* | 9/2011 | Clark et al. | 705/5 |
| 2013/0006715 A1* | 1/2013 | Warkentin et al. | 705/7.38 |
| 2013/0079964 A1* | 3/2013 | Sukkarie et al. | 701/22 |
| 2013/0082820 A1* | 4/2013 | Tieman | 340/5.61 |
| 2014/0011483 A1* | 1/2014 | Baumert | G07C 5/008 455/414.1 |
| 2014/0094987 A1* | 4/2014 | Healey et al. | 701/1 |

* cited by examiner

700

```
┌─────────────────────────────────────────────────────────────┐
│ RECEIVING INFORMATION FROM A REMOTE REPORTING DEVICE IN CLOSE│
│ PROXIMITY TO AN ASSET, THE INFORMATION INCLUDING A FIRST UNIQUE│
│ IDENTIFIER ASSOCIATED WITH THE ASSET AND A SECOND UNIQUE    │
│ IDENTIFIER ASSOCIATED WITH A USER OF THE ASSET              │
│                            702                              │
└─────────────────────────────────────────────────────────────┘
                              │
                              ▼
┌─────────────────────────────────────────────────────────────┐
│ ASSOCIATING THE ASSET WITH THE USER BASED ON THE INFORMATION │
│                            704                              │
└─────────────────────────────────────────────────────────────┘
                              │
                              ▼
┌─────────────────────────────────────────────────────────────┐
│ MONITORING USE OF THE ASSET AND MAINTAINING A RECORD OF THE USE│
│         BY THE USER BASED ON THE INFORMATION                │
│                            706                              │
└─────────────────────────────────────────────────────────────┘
                              │
                              ▼
┌─────────────────────────────────────────────────────────────┐
│ WHEN THE INFORMATION INCLUDES POSITION INFORMATION OF THE   │
│ REPORTING DEVICE, DETERMINING POSITION INFORMATION OF THE ASSET│
│   BASED ON THE POSITION INFORMATION OF THE REPORTING DEVICE │
│                            708                              │
└─────────────────────────────────────────────────────────────┘
```

IDENTIFYING A TELEPHONE NUMBER ASSOCIATED WITH A PORTABLE ELECTRONIC DEVICE, THE PORTABLE ELECTRONIC DEVICE ASSOCIATED WITH A USER

802

PROMPTING THE USER OF THE PORTABLE ELECTRONIC DEVICE TO SUBMIT A UNIQUE IDENTIFIER ASSOCIATED WITH THE ASSET

804

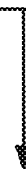

AUTOMATICALLY ASSOCIATING THE ASSET WITH THE USER BASED ON THE IDENTIFIED TELEPHONE NUMBER OF THE PORTABLE ELECTRONIC DEVICE AND BASED ON THE UNIQUE IDENTIFIER ASSOCIATED WITH THE ASSET

```
┌─────────────────────────────────────────────────────────────┐
│ RECEIVING DATA FROM A PORTABLE ELECTRONIC DEVICE ASSOCIATED │
│  WITH A USER, THE DATA INCLUDING A UNIQUE IDENTIFIER         │
│                 ASSOCIATED WITH THE ASSET                    │
│                                                              │
│                            902                               │
└─────────────────────────────────────────────────────────────┘
                              │
                              ▼
┌─────────────────────────────────────────────────────────────┐
│ IDENTIFYING A TELEPHONE NUMBER ASSOCIATED WITH THE PORTABLE  │
│                     ELECTRONIC DEVICE                        │
│                                                              │
│                            904                               │
└─────────────────────────────────────────────────────────────┘
                              │
                              ▼
┌─────────────────────────────────────────────────────────────┐
│  DETERMINING AN IDENTITY OF THE USER BASED ON THE TELEPHONE  │
│    NUMBER ASSOCIATED WITH THE PORTABLE ELECTRONIC DEVICE     │
│                                                              │
│                            906                               │
└─────────────────────────────────────────────────────────────┘
                              │
                              ▼
┌─────────────────────────────────────────────────────────────┐
│ AUTOMATICALLY ASSOCIATING THE ASSET WITH THE USER BASED ON   │
│ THE IDENTITY OF THE USER AND BASED ON THE UNIQUE IDENTIFIER  │
│                   ASSOCIATED WITH THE ASSET                  │
│                                                              │
│                            908                               │
└─────────────────────────────────────────────────────────────┘
```

```
┌─────────────────────────────────────────────────────────────┐
│ PROMPTING A USER OF AN ASSET TO PROVIDE A UNIQUE IDENTIFIER │
│                 ASSOCIATED WITH THE USER                    │
│                            1002                             │
└─────────────────────────────────────────────────────────────┘
                              │
                              ▼
┌─────────────────────────────────────────────────────────────┐
│    RECEIVING DATA FROM THE USER INDICATING THE UNIQUE       │
│            IDENTIFIER ASSOCIATED WITH THE USER              │
│                            1004                             │
└─────────────────────────────────────────────────────────────┘
                              │
                              ▼
┌─────────────────────────────────────────────────────────────┐
│    DETERMINING A UNIQUE IDENTIFIER ASSOCIATED WITH THE ASSET│
│                            1006                             │
└─────────────────────────────────────────────────────────────┘
                              │
                              ▼
┌─────────────────────────────────────────────────────────────┐
│ ASSOCIATING THE ASSET WITH THE USER BASED ON THE UNIQUE     │
│ IDENTIFIER ASSOCIATED WITH THE USER AND BASED ON THE UNIQUE │
│          IDENTIFIER ASSOCIATED WITH THE ASSET               │
│                            1008                             │
└─────────────────────────────────────────────────────────────┘
                              │
                              ▼
┌─────────────────────────────────────────────────────────────┐
│ MONITORING USE OF THE ASSET BY THE USER AND MAINTAINING A   │
│        RECORD OF THE USE BASED ON THE MONITORING            │
│                            1010                             │
└─────────────────────────────────────────────────────────────┘
```

FIG. 10

VEHICLE ASSOCIATION WITH DRIVER USING MOBILE TECHNOLOGIES

TECHNICAL FIELD

Embodiments of the present invention are related to Asset management. Particularly, embodiments of the present invention are directed to associating a vehicle to a user of the vehicle for position determination and monitoring of the vehicle.

BACKGROUND

Fleet tracking systems allow a user to monitor the position of a vessel or vehicle carrying a position reporting device. For example, the course of a vehicle being tracked can be inferred using successive position fixes sent by the position reporting device. The phrase "position fix" refers to a process of determining an unknown location using a fixed reference point or points. In a similar manner it can be inferred that the vehicle is not moving when successive position fixes report the same position. Fleet tracking systems are commonly used by delivery services for the routing and dispatching of vehicles. Asset recovery systems report the position of stolen or missing property (e.g., a stolen car) to a service provider or to the police in order to facilitate recovering the property.

However, many potential users find the cost of position reporting devices prohibitive. Many position reporting devices have a manufacturing cost in the range of hundreds to thousands of dollars and require extensive and/or crude hard installations in the item being tracked. Thus, the use of position reporting devices has typically been limited to high value items such as cars or other vehicles.

One drawback associated with these hard installed position reporting devices is that they do not always appropriately associate a particular driver of the vehicle with the vehicle itself. The conventional hard installed position reporting devices are able to report the activities of the vehicle itself, but they do not adequately associate the activities of a particular vehicle with the driver.

SUMMARY

Embodiments of the present invention associate a user of an asset, such as a company vehicle, to the asset using mobile electronic devices. For example, embodiments of the present invention enable a user of a particular asset to use a mobile device, such as a cellular phone to send a message to an asset management system to identify themselves, the asset, their location and any movement.

One benefit of the present invention is that vehicle and/or asset management can performed using personal electronic devices not requiring expensive hard-installed systems on the asset. Additionally, since personal electronic devices are generally directly associated with a single individual, it can be assumed that if the personal electronic device can be adequately identified, a particular user and/or owner of the device can be assumed.

Since many personal electronic devices have the capability to determine location, such as GPS positioning or cellular-based location determination, embodiments of the present invention can utilize the position information from a user's personal electronic device to track and monitor an asset, such as a company vehicle.

Since the personal electronic device can be directly associated with a user, the use of the asset can be directly associated with the user and the information can be sent to an asset management system via the user's personal electronic device.

One embodiment of the present invention includes a method for asset management. The method includes receiving information from a remote reporting device in close proximity to an asset, the information including a first unique identifier associated with the asset and a second unique identifier associated with a user of the asset. The method further includes associating the asset with the user based on the information. Additionally, the method includes monitoring use of the asset and maintaining a record of the use by the user based on the information.

Other embodiments of the present invention include a system for asset management. The system includes a receiver for receiving information from a remote reporting device in close proximity to an asset, the information including a first unique identifier associated with the asset and the information including a second unique identifier associated with a user of the asset. The system also includes an asset management module coupled with the receiver for associating the asset with the user based on the information and for monitoring use of the asset by the user. Further included in the system is a database coupled with the asset management module for maintaining a record of the information.

Another embodiment of the present invention includes a method for tracking an asset. The method includes identifying a telephone number associated with a portable electronic device, the portable electronic device associated with a user. The method further includes prompting the user of said portable electronic device to submit a unique identifier associated with the asset and automatically associating the asset with the user based on the identified telephone number of the portable electronic device and based on the unique identifier associated with the asset.

Another embodiment of the present invention includes a method for tracking an asset. The method includes receiving data from a portable electronic device associated with a user, the data including a unique identifier associated with the asset. The method further includes identifying a telephone number associated with the portable electronic device and determining an identity of the user based on said telephone number associated with the portable electronic device. The method also includes automatically associating the asset with the user based on the identity of the user and based on the unique identifier associated with the asset.

Another embodiment of the present invention includes a method for asset management. The method includes prompting a user of an asset to provide a unique identifier associated with the user. The method also includes receiving data from the user indicating the unique identifier associated with the user and determining a unique identifier associated with the asset. The method further includes associating the asset with the user based on the unique identifier associated with the user and based on the unique identifier associated with the asset and monitoring use of the asset by the user and maintaining a record of the use based on the monitoring.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description are not drawn to scale.

FIG. 7 is a block diagram of an exemplary method for associating a user with an asset using position data, according to an embodiment of the present invention.

FIG. 8 is a block diagram of an exemplary method for prompting a user to enter vehicle specific information to enable association of the user with the vehicle according to an embodiment of the present invention.

FIG. 9 is a block diagram of an exemplary method for receiving data from a personal electronic device associated with a user to enable association of the user with a vehicle according to an embodiment of the present invention.

FIG. 10 is a block diagram of an exemplary method for using an on-board tracking system of a vehicle to receive data from a personal electronic device associated with a user to enable association of the user with a vehicle according to an embodiment of the present invention.

DETAILED DESCRIPTION

Figure 1:
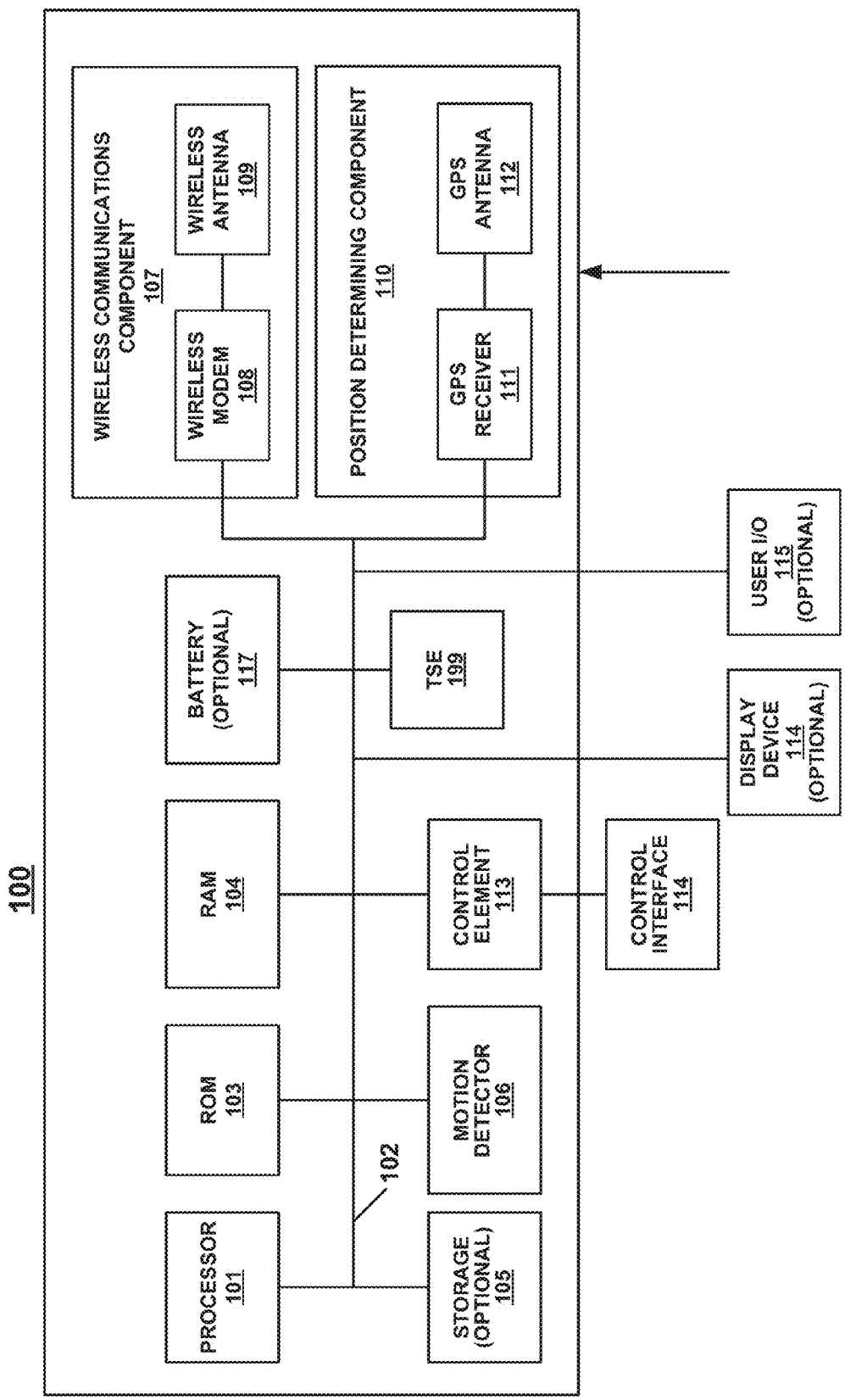
FIG. 1 depicts an exemplary initiating component, according to an embodiment of the present invention.

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, objects, and circuits have not been described in detail as not to unnecessarily obscure aspects of the present invention.

Embodiments of the present invention associate a user of an asset, such as a company vehicle, to the asset using mobile electronic devices. For example, embodiments of the present invention enable a user of a particular asset to use a mobile device, such as a cellular phone to send a message to an asset management system to identify themselves, the asset, their location and any movement.

One benefit of the present invention is that vehicle and/or asset management can performed using personal electronic devices, not requiring expensive hard-installed systems on the asset. Additionally, since personal electronic devices are generally directly associated with a single individual, it can be assumed that if the personal electronic device can be adequately identified, a particular user and/or owner of the device can be assumed.

Many different methods can be used to provide appropriate vehicle and/or user information to an asset management system. Once an association is made, tracking of the vehicle can be performed using the personal electronic device associated with the user, for example.

In one embodiment of the invention, the driver of a vehicle makes a telephone call to a centralized asset management system. Once the connection is made, the user is prompted to enter a vehicle identifier, such as a license plate number. The asset management system is able to identify the driver, based on the telephone number associated with the personal electronic device. In combination with the vehicle identifier, the asset management system is capable of efficiently and accurately associate the driver with the vehicle.

Using functionality built into modern personal electronic devices, such as GPS systems, the personal electronic device can periodically provide position information to the asset management system. This position information can be used to track and monitor the use of the vehicle. In this sense, the activities of the vehicle are directly associated with the driver, making the driver accountable for their use of the vehicle.

In one embodiment of the invention, a driver sends a text message to the asset management system. The text message could include a vehicle identifier such as a license plate number or a company vehicle number. Additionally, the text message could include a picture attachment showing, for example, the vehicle license plate. The asset management system can determine the vehicle identity based on the message sent from the driver. The driver's identity can be determined based on the phone number associated with the device from which the message was sent.

Although the present invention functions without requiring hard-installed tracking systems on an asset, it is appreciated that embodiments of the present invention can be used in conjunction with vehicles and/or assets that already have hard-installed tracking systems installed. In this embodiment, the use of a personal electronic device in conjunction with the hard-installed tracking system can be used to automatically associate a user and an asset.

For example, in one embodiment, a user's personal electronic device communicatively couples with a hard installed vehicle tracking system. Once communicatively couple, the hard installed vehicle tracking system can identify the driver, based on identifying the user's personal electronic device.

In one embodiment, the asset management system of the present invention uses a telephony system to receive inbound information from the user's mobile device and associates the user to the tracked asset. Once association is complete, the asset management system can receive information from the user's electronic device to monitor mobile activities of both the driver and the asset.

In one embodiment, real-time information captured about the vehicle and/or driver such as vehicle status, location, route and progress, is sent via the user's personal electronic device to the asset management system where the information is stored in an associated manor.

In one embodiment, speeding incidences, idle duration, trip details and other business logics can be correlated with the driver so the driver can be accountable for his/her in-vehicle actions.

In one embodiment of the present invention, a smartphone application is used to facilitate transmission of data to the asset management system.

It is appreciated that embodiments of the present invention are described in the context of tracking vehicle activity, it is appreciated that embodiments of the present invention can be used to track any mobile asset, vessel, vehicle, etc.

Exemplary Initiating Component

FIG. 1 depicts an exemplary initiating component 100, according to an embodiment of the present invention. Initiating component 100 is used to report data to the asset management system of the present invention. Initiating component 100 could comprise more than one separate device. Initiating component 100 could be part of a personal electronic device associated with a user. Initiating component 100 could also be a hard-installed tracking device that is installed in a vehicle.

Initiating component 100 comprises a processor 101 coupled with an address/data bus 102. Processor 101 is for processing digital information and instructions and bus 102 is for conveying digital information between the various components of initiating component 100. Also coupled with bus 102 is a non-volatile read only memory (ROM) 103 for storing information and instructions of a more permanent nature, and a random access memory (RAM) 104 for storing the digital information and instructions of a more volatile nature.

In addition, initiating component 100 may optionally include a data storage device 105 for storing vast amounts of data. In embodiments of the present invention, data storage device 105 may comprise a removable storage medium such as a smart card or an optical data storage device. Alternatively, data storage device 105 may comprise a programmable data storage device such as a flash memory device to facilitate quickly updating data.

It should be noted that instructions for processor 101 as well as position coordinates which define a pre-defined zone, previously determined geographic locations and/or pseudo ranges of initiating component 100, previously sampled GNSS signals, and configuration data for determining what action should be initiated depending upon the current time and/or location of initiating component 100, can be stored either in volatile memory 104, data storage device 105, or in an external storage device (not shown).

Initiating component 100 also comprises a time sensitive element (e.g. component, device, etc.) 199. In one embodiment, time sensitive element 199 is disposed within processor 101. For instance, in one embodiment, time sensitive element 199 comprises the real time clock with which processor 101 operates. In one embodiment, time sensitive element 199 comprises a device, such as a real time clock, a crystal oscillator, etc., coupled to processor 101 with bus 102, which can function in conjunction with or independently of a clock or processor 101.

In one embodiment, time sensitive element 199 is operable with wireless communications component 107, I/O 115, and/or position determining component 110 for time checking, updating, synchronizing, adjusting, etc., with a source of reliable time signals such as may be associated with and/or promulgated, e.g., wirelessly, telephonically, etc. by a geo-positioning entity, a network or communication entity, a standard time source such as is maintained (e.g., operated, promulgated, etc.) by the National Institute for Standards and Technology (NIST) of the U.S. Department of Commerce or another government, scientific, commercial or other time reporting entity.

Initiating component 100 further comprises a motion detector 106 coupled with bus 102 for detecting changes in the motion state of initiating component 100. In one embodiment, motion detector 106 detects the vibration associated with the movement of initiating component 100 and indicates this movement to processor 101 when changes in the vibration of initiating component 100 are detected.

In other embodiments of the present invention, motion detector 106 may be a magneto-restrictive motion detector (MRMD), an acceleration sensor (e.g., accelerometer), a tilt sensor, a rotation sensor, a gyroscope, etc. However, while the present embodiment recites these particular implementations of motion detector 106, the present invention is well suited to utilize a variety of devices for detecting movement of initiating component 100 and for indicating this movement to processor 101. A MRMD used in one implementation comprises a device similar to those provided by Honeywell, Inc., a corporation in Morristown, N.J. MRMDs typically operate according to principles explained in a paper entitled "A New Perspective on Magnetic Field Sensing," by T. Bratland, M. J. Caruso, C. H. Smith and R. Schneider (1998), which is available from Honeywell. Inc., and which is incorporated herein in its entirety by reference.

In accordance with embodiments of the present invention, motion detector 106 detects when initiating component 100 transitions from a substantially stationary state to a moving state. Motion detector 106 can also detect when initiating component 100 transitions from a moving state to a substantially stationary state. Thus, in embodiments of the present invention, motion detector 106 detects changes in the state of motion of initiating component 100 such as starting or stopping of motion and generates an interrupt to processor 101. In response to these changes in motion, an interrupt is generated by motion detector 106. In response to an interrupt from motion detector 106, processor 101 changes the operating state of initiating component 100 from an idle operating state, in which a few components of initiating component 100 (e.g., wireless communications component 107 and position determining component 110) draw a minimal amount of power, to an active operating state in which the initiating component 100 draws additional power.

A wireless communications component 107, comprising a wireless modem 108 and a wireless antenna 109, is coupled with bus 102. A position determining component 110, comprising a GNSS receiver 111 and a GNSS antenna 112, is also coupled with bus 102.

Wireless communications component 107 is for transmitting and receiving wireless messages (e.g., data and/or commands). In one embodiment, wireless communications component 107 is comprised of a cellular wireless antenna 109 and a cellular wireless modem 108. In one embodiment, initiating component 100 sends and receives messages using, for example, the Short Message Service (SMS). In other embodiments of the present invention, wireless communications component 107 may comprise a wireless communications device such as a radio device, a Bluetooth wireless communications device, or any other wireless communications devices such as a Wi-Fi transceiver or near field communications (NFC) hardware. Wi-Fi transceivers are often used to create local area networks between a portable computer and an Internet access point in public areas such as airports, coffee shops, libraries, and the like.

Position determining component 110 is for determining the location of initiating component 100. In embodiments of the present invention, position determining component 110 comprises a GNSS antenna 112 and a GNSS receiver 111. However, while the present embodiment specifically recites a GNSS position determining system, embodiments of the present invention are well suited to utilize a variety of terrestrial-based and satellite-based position determining systems as well.

A control element 113 is coupled with bus 102 and is for generating a control signal via control interface 114 depending upon the current time and/or location of initiating component 100. It is noted that while control element 113 is shown as a separate element, in embodiments of the present invention, the control element functionality may be implemented by processor 101.

Devices which are optionally coupled to initiating component 100 include a display device 116 for displaying information to a user. Display device 116 may be a liquid crystal device, cathode ray tube, a field emission display, or other display device suitable for creating graphic images and alpha-numeric characters recognizable to a user. A user input device 115 may also be coupled with bus 102 in embodiments of the present invention. In embodiments of the present invention, user input device 115 may comprise a keyboard, and a cursor control device (e.g., a mouse, trackball, light pen, touch pad, joystick, etc.), for inputting data, selections, updates, and for controlling initiating component 100.

Initiating component 100 may optionally include a battery 117 for providing power for initiating component 100. While the present embodiment recites a battery powered device, the present invention is well suited to be electrically coupled with the device it is controlling and for drawing power from that device. For example, if initiating component 100 is disposed within a laptop computer, it may draw power from the laptop computer itself.

In embodiments of the present invention, components of initiating component 100 may be disposed upon a printed circuit board 120 such as a Personal Computer Memory Card Industry Association (PCMCIA) card, etc. This allows embodiments of the present invention to be used in a variety of electronic devices such as cellular telephones, laptop computers, PDAs, and the like. However, in other implementations of the present invention, initiating component 100 may be a stand alone device that is used to control another device. For example, initiating component 100 may be installed in an automobile and used to initiate an action depending upon the location of the automobile. Thus, the components comprising initiating component 100 may be disposed within a housing.

It is appreciated that some of the components recited in the above discussion may be omitted in embodiments of the present invention. For example, when initiating component 100 is disposed within a laptop computer, or a PDA, display device 116 and user input device 115 may be redundant and therefore omitted to reduce the cost of initiating component 100. In other implementations of the present invention, initiating component 100 may be disposed in an electronic device already having a wireless communications capability (e.g., a cellular telephone). Thus, wireless communications component 107 may be omitted in embodiments of the present invention in order to reduce the cost of initiating component 100. Additionally, control element 113 may be omitted in embodiments of the present invention. For example, a control signal may be generated by processor 101 via control interface 114 for controlling an electronic device.

In embodiments of the present invention, when motion detector 106 detects movement of initiating component 100, it generates an interrupt signal to processor 101. In response to the interrupt signal, processor 101 activates other components of initiating component 100 such as wireless communications component 107 and/or position determining component 110. The geographic location of initiating component 100 is then determined using position determining component 110. Processor 101 compares the present geographic location with geographic coordinates that define a pre-defined zone. The coordinates of the pre-defined zone may reside in RAM 104 or in storage device 105. Based upon this comparison, processor 101 causes control element 113 to generate a command for controlling the electronic device in which initiating component 100 resides.

Alternatively, processor 101 may generate the command for controlling the electronic device itself. For example, initiating component 100 may be configured to generate a command causing the electronic device to become deactivated when it enters a restricted zone such as a theater, or the gangway leading from the departure lounge to the aircraft while boarding. Since the unit is programmed to operate autonomously to perform this shutdown function, it will work for items which are stored in luggage as well, performing another valuable service by ceasing battery drain while located in an unusable space. When the electronic device moves outside of the restricted zone, processor 101 may generate a signal causing the electronic device to become activated again. This is a great convenience to users who may forget to turn off their electronic devices when they enter a restricted area or to turn them back on when they leave the restricted area.

It should be appreciated that a full forced power shutdown exemplifies one type of deactivation and that re-energizing after such a power down exemplifies one type of reactivation. Embodiments of the present invention are well suited to deactivate and/or reactivate the electronic device in other ways, e.g., short of a full power-down event and/or re-energizing thereafter. For instance, the device can be deactivated without a full power down, as where wireless transmissions from the device may be disabled while within a geo-temporally restricted zone, yet remain capable of performing another function. Similarly, in this instance, reactivating the device after such a deactivation could simply comprise restoring wireless transmission capability to the device upon leaving the geo-temporal zone wherein such transmissions are forbidden (e.g., to be secured, forced transmission squelched, etc.).

In embodiments of the present invention, storage device 105 stores a database of vehicle identifiers and/or user identifiers. In one embodiment, the user identifiers may include telephone numbers associated with different users. In another embodiment, the storage device stores geographic coordinates which can define a plurality of pre-defined zones and associated commands that are to be generated by processor 101 depending upon whether the electronic device is inside of or outside of a pre-defined zone.

Additionally, the geographic coordinates can define a route or plurality of routes. If the electronic device deviates from a specified route, processor 101 can generate commands to the electronic device. For example, processor 101 can cause the electronic device to sound an alarm or other noise, vibration, light emission, and/or production, emission, and/or presentation of any other human-detectable, human sensory sensitive, etc. stimulus, attention elicitor, irritant, or the like, for instance, as a theft deterrent if the device is removed from a specified zone. Alternatively, processor 101 can initiate sending a message via wireless communications component 107 notifying the owner of the electronic device that it has left a specified zone, or notify police or other agencies. Additionally, processor 101 can initiate continuous location updates to assist in recovering the electronic device if it has been stolen.

The geographic location or route information used to determine what action should be initiated by the present invention may further be modified using temporal information. For example, if initiating component 100 is disposed within an automobile, time parameters may be used in conjunction with location parameters to determine what action should be initiated by the present invention. Thus, users could designate their typical route used when commuting to work and the hours when the automobile is permitted to be within that route. If the automobile is stolen, even if it is at a geographic location within the pre-defined boundaries of the commuting route, initiating component 100 may generate a control signal because it is at that location at the wrong time of the day. Initiating component 100 may initiate generating a message conveying that the automobile has been stolen as described above, or may in some manner disable the automobile to prevent further movement of the automobile.

For example, initiating component 100 may be coupled with the ignition system or the computer of the automobile. After determining that unauthorized movement of the automobile has occurred, initiating component 100 may generate a control signal to disable the automobile's engine the next time motion detector 106 determines that the automobile has stopped moving. This is so that initiating component 100 does not disable the automobile, for example, in the middle of a highway which may endanger other commuters. An initiating device lacking the motion detector of the present invention would not be able to perform in this manner and may provide a less flexible or responsive solution to some situations addressed by the present invention.

Utilizing a motion detector with a position determining device is seemingly counter-intuitive or at least redundant in the current position reporting environment which relies upon successive position fixes to imply movement of the reporting device. For example, receiving a series of position reports which come from different locations implies that the initiating device is in motion. Alternatively, receiving a series of position reports which come from the same location implies that the initiating device is stationary. Therefore, it was considered redundant to incorporate a motion detecting component into a device which already had an implied function of detecting and reporting motion.

However, providing initiating component 100 with motion detector 106 is advantageous because it reduces the amount of time that components of initiating component 100 are activated in order to determine a geographic location and thus extends the battery life of the electronic device with which initiating component 100 is coupled. In prior art initiating devices, determining whether the device was moving or stationary depended upon determining and comparing successive position fixes. If successive position fixes were from the same location, it was inferred that the device was stationary. If successive position fixes were from different locations, it was inferred that the device was in motion.

These position fixes had to be provided at a regular interval in order to provide timely notification that the device was being moved. However, providing successive position fixes for a device which has not moved is an unnecessary drain of battery power, especially when the device remains stationary for extended periods of time. This in turn is burdensome to users of the device who are required to frequently replace the batteries of the electronic device in which initiating component 100 is disposed or to couple the electronic device to an external power source.

In embodiments of the present invention, storage device 105 or volatile memory 104, etc. may also store previously determined geographic positions of initiating component 100, other position information such as previously determined pseudoranges, and/or previously sampled GNSS signals as an aid to signal acquisition in environments where a clear path to the satellites is either partially or totally obscured, as inside a building. For example, in some GPS implementations, previously sampled GPS signals are used to more rapidly determine the current location of a GPS receiver and improve its sensitivity during low signal-to-noise ratio conditions.

Thus, embodiments of the present invention are well suited to enable an electronic device to determine its location and the time on a stand alone basis, or in conjunction with other so-called "aiding" systems. When the electronic device is outside of the coverage area of a wireless communications system, it can still determine its location and the time using embodiments of the present invention.

Exemplary Position Determining System

Figure 2:
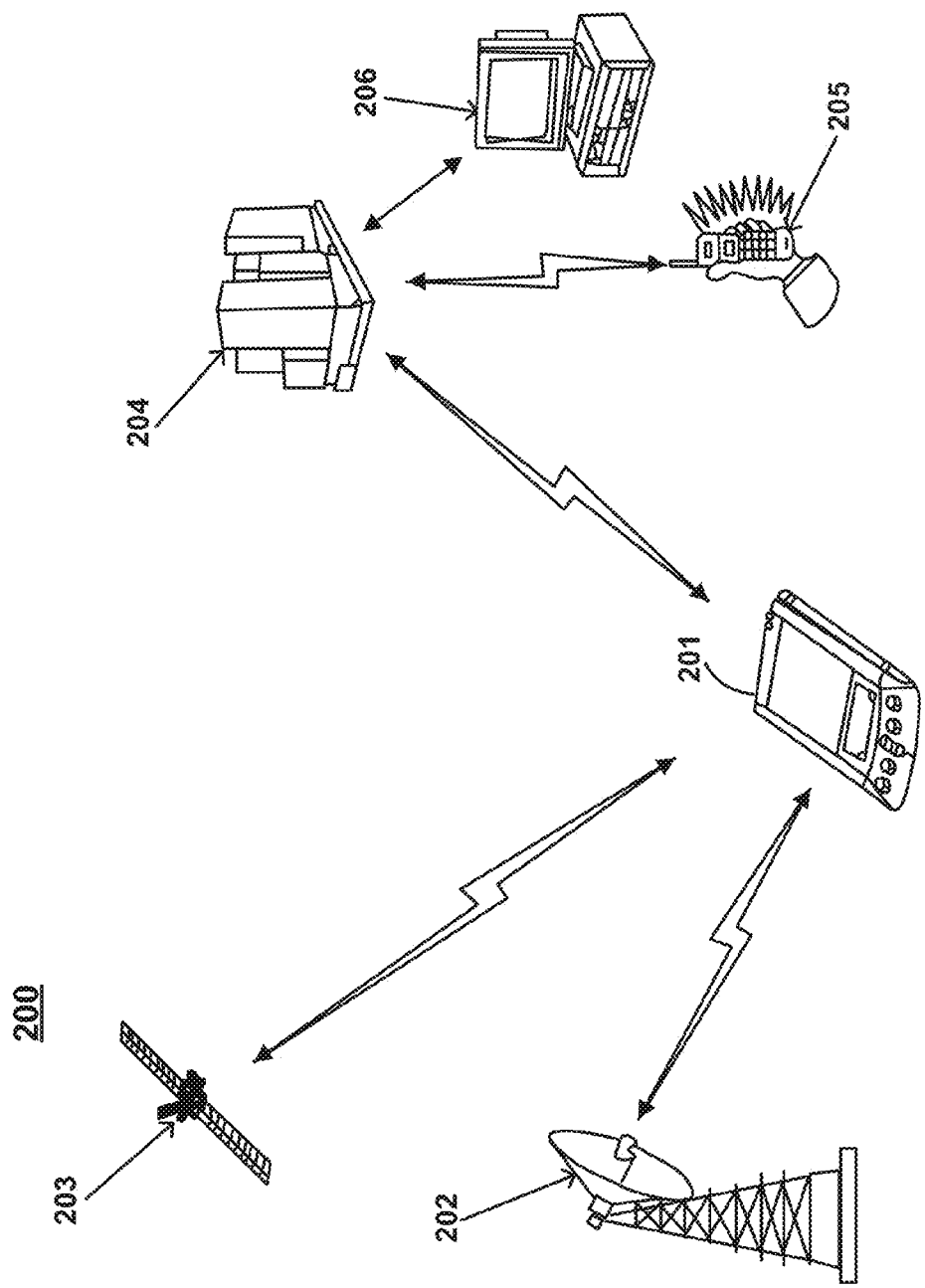
FIG. 2 depicts an exemplary position determining system, according to an embodiment of the present invention.

FIG. 2 depicts an exemplary position determining system 200, according to one embodiment of the present invention. System 200 comprises an electronic device 201 that is coupled with or part of initiating component 100 (FIG. 1), a position determining system (e.g., position determining system 202 or 203), and a position tracking service provider 204. In one embodiment, initiating component 100 is disposed within electronic device 201.

As depicted in FIG. 2, electronic device 201 is capable of wireless communications with service provider 204. When electronic device 201 is moved, initiating component 100 detects the movement and determines its geographic location using position determining system 202 and/or position determining system 203.

In accordance with embodiments of the present invention, position determining system 202 is a terrestrial-based position determining system. There are a variety of terrestrial-based position determining systems which can be utilized by embodiments of the present invention such as LORAN-C, Decca, radio beacons, television transmissions, etc. Furthermore, the present invention is well suited to utilize future implementations of terrestrial-based position determining systems.

In other embodiments of the present invention, initiating component 100 utilizes a satellite-based position determining system 203 to determine its position. There are a variety of satellite-based position determining systems which can be utilized by embodiments of the present invention such as GNSS, GPS, Differential GPS (DGPS), Eurofix DGPS, GLONASS, etc. Furthermore, the present invention is well suited to utilize future implementations of satellite-based position determining systems such as the Galileo™ system.

As described above, embodiments of the present invention can determine the location of electronic device 201 and determine user of the electronic device. In one embodiment, the user is directly associated with a vehicle and it can be determined that the location of the portable electronic device is approximately the location of the vehicle associated with the user. In one embodiment, the present invention can determine the location of electronic device 201 and then compare the present location of electronic device 201 with a set of geographic coordinates of a pre-defined zone or route.

Depending upon the relationship between the present location of electronic device 201 and the pre-defined zone or route, initiating component 100 may generate a command causing electronic device 201 to perform an action. For example, if electronic device 201 is moved from a specified zone without permission, a wireless message may be sent to position tracking service provider 204 as notification. Alternatively, initiating component 100 may cause electronic device 201 to emit an audible alarm until a user enters a security code (e.g. using input device 115; FIG. 1).

In one embodiment, in response to control with initiating component 100, electronic device 201 emits a wireless query message to access information relating to the local time corresponding to the current geo-location of the device. Thus, in one exemplary implementation, device 201 wirelessly queries a provider of information relating to the local time corresponding to that location when it is inactive (e.g., asleep, powered down, etc.) during movement from one geo-location to another, such as during travel. Yet the device remains responsive to reaching the destination geo-location.

While the embodiment of FIG. 2 recites using initiating component 100 in conjunction with a position tracking service provider (e.g., position tracking service provider 204; FIG. 2), the present invention is well suited to being used as a stand alone device. That is, initiating component 100 may be used to control an electronic device without interacting with position tracking service provider 204. For example, a user may simply desire to cause electronic device 201 to perform specific actions depending upon the geographic zone it is in, but not to report to position tracking service provider 204.

Asset Management Network

Figure 3A:
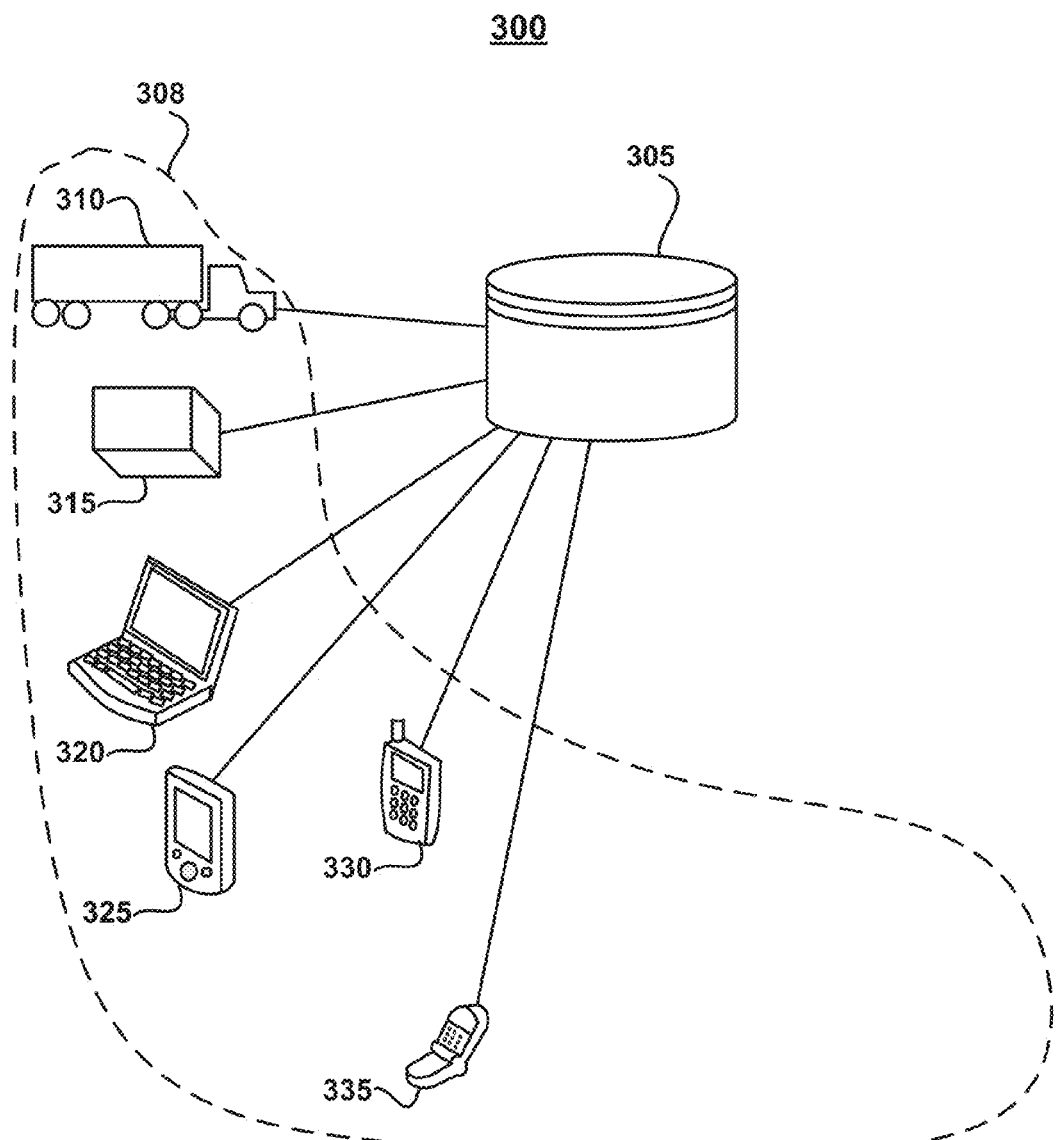
FIG. 3A depicts a plurality of reporting sources for tracking an asset, according to an embodiment of the present invention.

With reference now to FIG. 3A, a network diagram of an exemplary method for asset management is shown in accordance with one embodiment of the present invention. Asset management network 300 includes a database 305, and a plurality of reporting sources 308.

Database 305 receives information from at least one reporting source 308 and the data within database 305 is organized such that information regarding an asset can be ascertained. For example, the data within database 305 may be organized such that information regarding users of a particular asset, or a plurality of assets, can be ascertained or accessed. Database 305 includes information about particular assets as well as users of the assets. Database 305 may include user profiles of particular users of the assets. For example, database 305 may include information associated with personal electronic devices associated with particular users such as cell phone numbers, email addresses, Bluetooth frequencies, etc. that are directly associated with a particular user by their personal electronic devices. Likewise, database 305 may include information that is directly associated with an asset such as a vehicle identification number (VIN number), license plate number, vehicle name, etc. that can be used to uniquely identify an asset.

In one embodiment, database 305 may actually consist of a plurality of databases on a single computing system or on a plurality of computing systems. Moreover, the plurality of databases may be in the same location or spread throughout a plurality of locations. Additionally, the plurality of databases may be wired or wirelessly coupled together to form a network of databases upon which the asset information may be stored. In one embodiment, the asset may be machinery, a vehicle, an electrical or mechanical device, an inanimate object or any other traceable item.

Plurality of reporting sources 308 include devices such as, but not limited to, permanently mounted device 310, asset mountable/detachable device 315, portable computing device 320, personal digital assistant 325, smart phone 330, and mobile phone 235. Although, a plurality of reporting sources 308 is shown, the list is exemplary. It is appreciated that the reporting source 308 may include any number of reporting sources and reporting source methods including telephone, text message, picture or media message, instant messaging, email, audio, video, Braille, code, passwords and the like.

For example, reporting sources 308 can include electronic devices, GNSS enabled devices, machine controls, video enabled devices (e.g., camera enabled handheld devices (such as a mobile phone with camera/video. PDA with camera/video, watch with camera/video, etc.), video cameras, webcams, and the like), human sources, the asset being monitored, other assets, and the like. In one embodiment, any or all of the reporting sources 308 are capable of providing asset information including, but not limited to, location information, operation information and status information.

In one embodiment, asset mountable/detachable device 315 may be a TrimTrac™ device, a CrossCheck® device (both provided by Trimble Navigation Limited), a radio frequency identifier (RFID), a global navigation satellite system (GNSS) receiver, a video device providing a video feed, and the like. Moreover, each reporting source 308 may include capabilities such as position fixing, photography, text messaging, voice messaging, data messaging, radio frequency identification tag reading and the like.

Furthermore, in one embodiment, any or all of the reporting sources 308 may be capable of asset operation monitoring. For example, any or all of the reporting sources 308 may be capable of being connected to the asset to monitor aspects of the asset including, but not limited to, a J-bus, a CAN-bus, a processor coupled with the asset, a diagnostic evaluator, an engine microprocessor, a mileage indicator, a speedometer, a tachometer, an oil pressure indicator, a wheel pressure indicator, a hydraulic indicator, an engine time monitor, an ignition switched power source, and the like.

In one embodiment of the invention, one of the reporting devices can communicate with another reporting device, which then communicates with database 305. For example, a user of an asset may use a smart phone 330 to communicate with asset mountable/detachable device 315 which then communicates with database 305. In this embodiment, the a user of a particular asset can use one reporting device 308 to input data and another reporting device 308 sends the data to the database 308.

In this embodiment, one or more reporting devices can function as a data bridge and or communication interface between other reporting devices and the database 305. In one embodiment, one or more reporting devices may be directly associated with a particular user and one or more reporting devices may be directly associated with a particular asset. In this embodiment, the present invention can make direct associations between assets and users of the particular asset. Additionally, in this embodiment, the present invention can make direct associations between users and particular asset use.

Figure 3B:
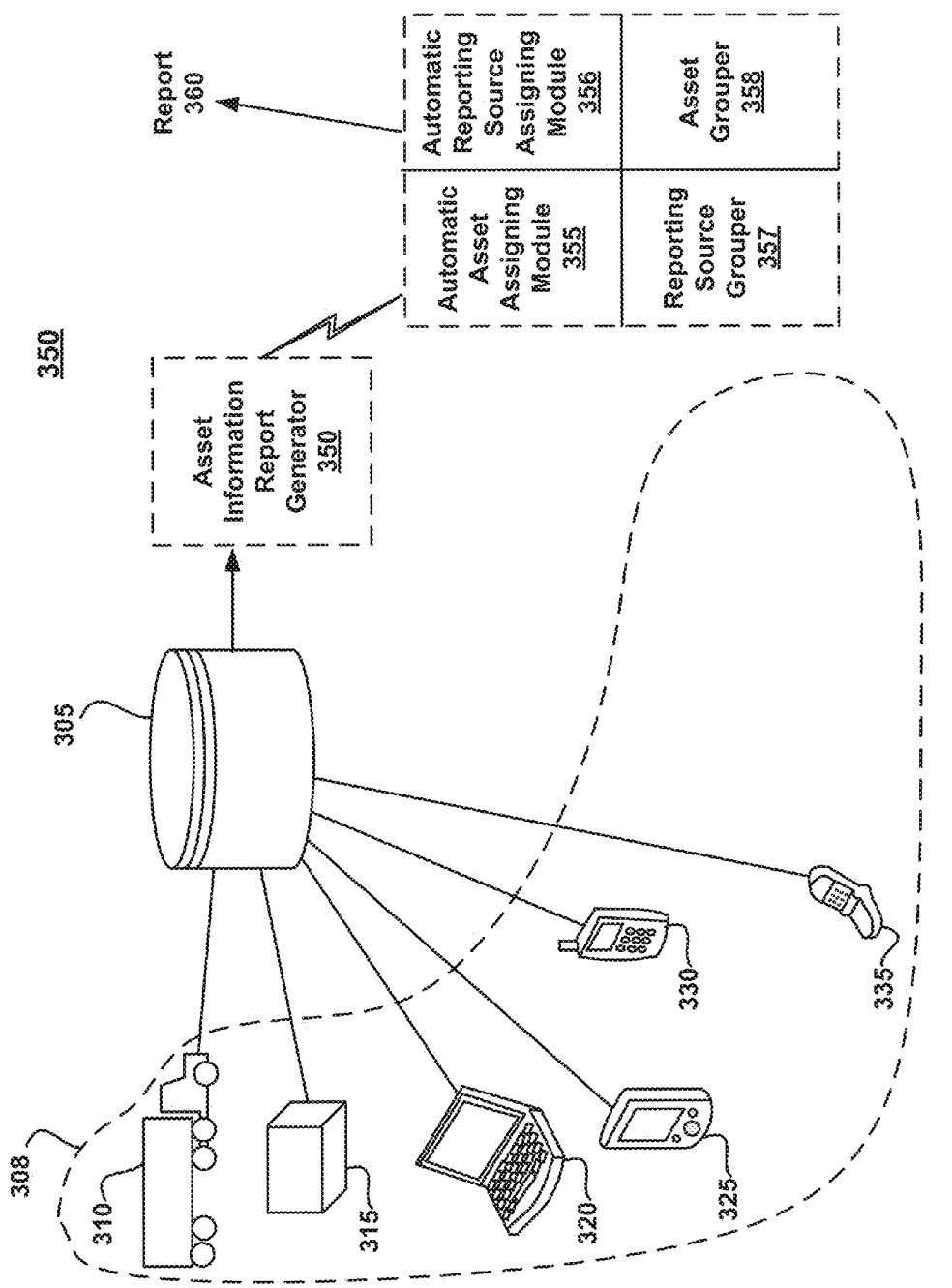
FIG. 3B depicts a database and report generator for tracking an asset, according to an embodiment of the present invention.

With reference now to FIG. 3B, a network diagram of an exemplary method for asset management is shown in accordance with another embodiment of the present invention. In one embodiment, asset management network 350 includes a database 305, and a plurality of reporting sources 308 which are similar in form and function to that of FIG. 3A and are not described again in detail for purposes of brevity and clarity. However, asset management network 350 also includes the asset information report generator 350 and asset information report 360. Further details of the description and operation of asset information report generator 350 and asset information report 360 are provided in the discussion of FIG. 4.

Asset management network 350 also includes an automatic asset assigning module 355, an automatic reporting source assigning module 356, a reporting source grouper 357 and an asset grouper 358. In general, these components are used to provide further organization to the asset information report 360.

Basically, automatic asset assigning module 355 is configured to assign an asset to a section in the asset information report 360. Automatic reporting source assigning module 356 is configured to assign a reporting source 308 to a user of an asset and store the association in a section in asset information report 360. Reporting source grouper 357 is configured to group plurality of reporting sources 308 into at least one user of the asset. Asset grouper 358 is configured to group at least one asset into at least one group. The exemplary automatic reporting source assigning module 356 of the present invention can be used to make an association between a particular asset and a user of the asset based on information received from any of the reporting sources 308. Details of the exemplary automatic reporting source assigning module 356 are provided below.

Asset Management System

Figure 4:
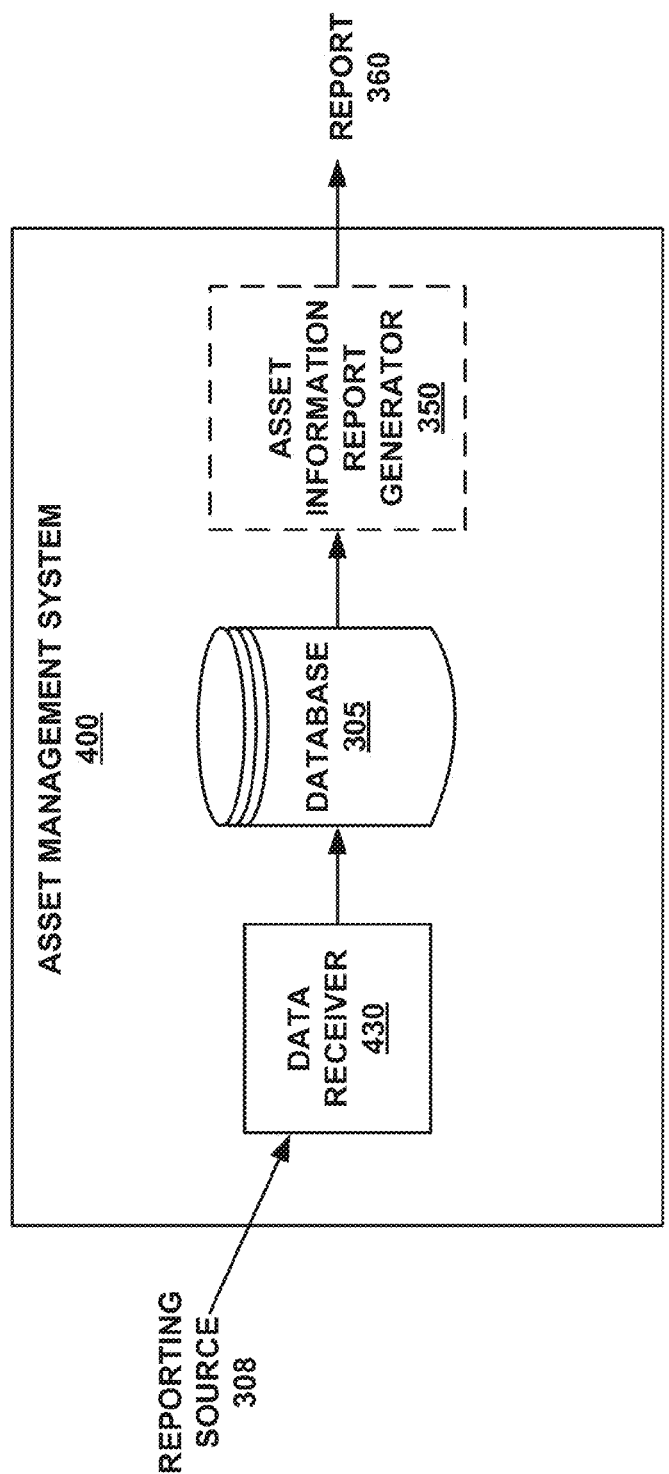
FIG. 4 depicts a block diagram of an exemplary asset management system, according to an embodiment of the present invention.

Referring now to FIG. 4, a block diagram of an exemplary asset management system 400 is shown in accordance with one embodiment of the present invention. In one embodiment, asset management system 400 receives input from a first reporting source 308.

It should be noted that although embodiments of the present invention are well suited for use with only a single reporting source 308, it should be noted that in one embodiment of the present invention there may be two or more different reporting sources providing information to asset management system 400. For example, there may be three, four, seven, fifteen, or any number of different reporting sources providing information to asset management system 400. In one embodiment, the reporting sources input to asset management system 400 consists of information about the user of the asset and information about the asset itself such as, but not limited to, operation, location, status, and the like.

In one embodiment, asset management system 400 includes a data receiver 430 and a database 305. In general, data receiver 430 is a wired or wireless connection that provides a connection between the asset management system 400 and the outside reporting sources such as reporting source 308. In one embodiment, the connection is a network connection such as a local area network (LAN) connection, a wide area network (WAN) connection, a virtual private network (VPN), a cellular network, or the like. In another embodiment, the data receiver 430 will receive the information from the reporting sources via a direct connection.

For example, the reporting source 308 may be communicatively coupled (either wired such as via a universal serial bus (USB), firewire, or other data port, or wirelessly such as Bluetooth or the like) with the data receiver 430 and the information may be received directly to data receiver 430.

Data receiver 430 then (wired or wirelessly, via cell, WiFi, etc.) passes the received asset information to the database 305 wherein the information regarding the asset is stored. As stated herein, database 305 may be a single database on a single computing system or may actually consist of a plurality of databases on a single computing system or on a plurality of computing systems. Moreover, the plurality of databases may be in the same location or spread throughout a plurality of locations. Additionally, the plurality of databases may be wired or wirelessly coupled together to form a network of databases upon which the asset information may be stored.

In one embodiment, asset management system 400 may also include a report generator 350 which may provide an asset information report 360. In general, report generator 350 is one of a myriad of possible methods for organizing and presenting the information stored in database 305. For example, a user may query the asset management system 400 regarding one or more assets and or users of the asset. The asset management system 400 may simply provide the results of the query to the report generator 350. Report generator 350 then generates asset information report 360 which would include the answers to the user's query. The asset information report 360 may be presented in a plurality of ways depending on user preference, system requirements and the like.

For example, the asset information report 360 may be provided in a visual format, such as a piece of paper, or a graphic user interface (GUI) displayed on a cell phone, a PDA or laptop or desktop computer system.

Example Data Inputs

Figure 5:
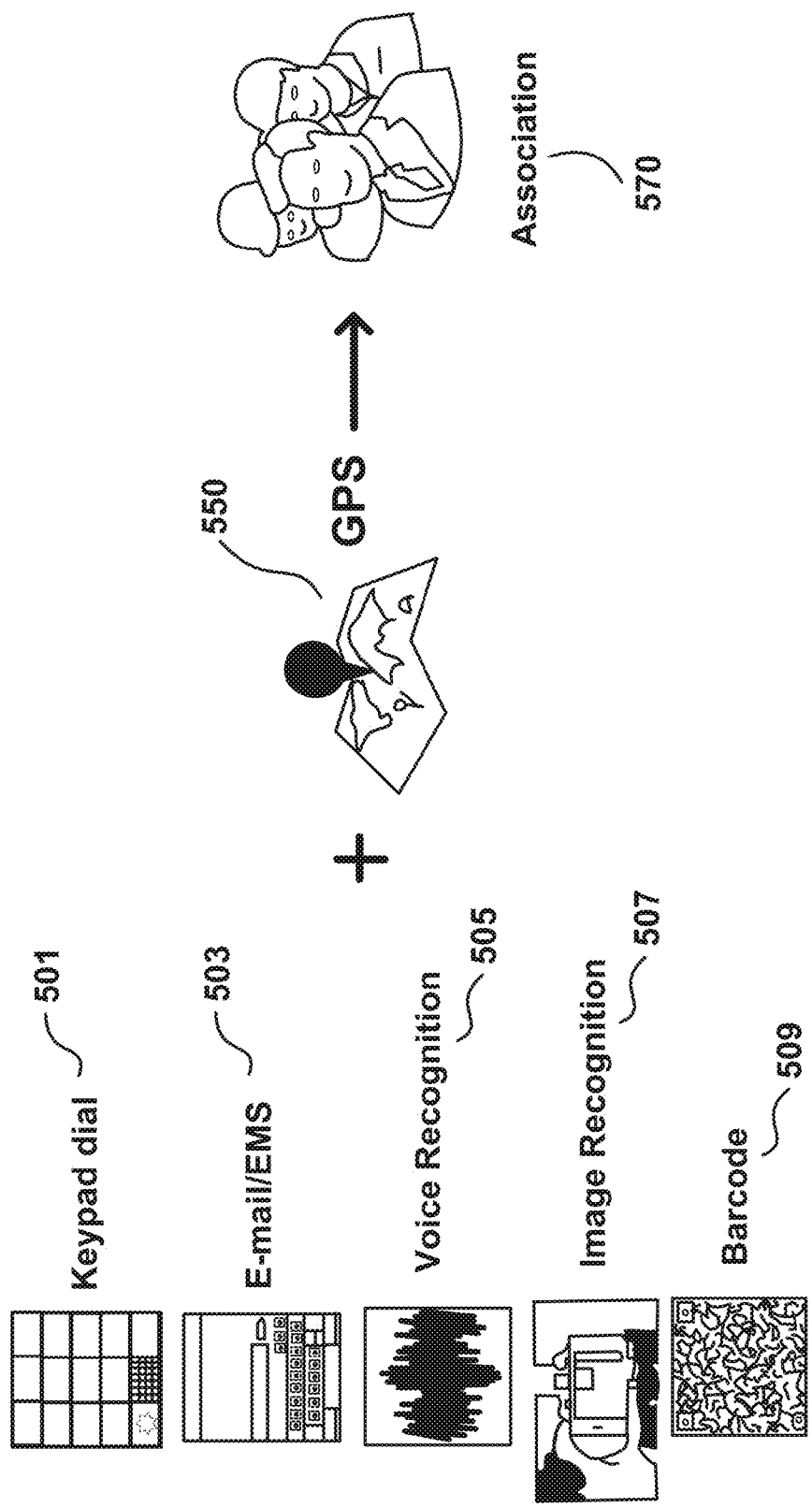
FIG. 5 depicts various types of data that can be used to associate an asset with a user of an asset, according to an embodiment of the present invention.

FIG. 5 depicts various types of data that can be used to associate an asset with a user of an asset, according to an embodiment of the present invention.

In one embodiment, a user or driver of a vehicle enters a user ID and/or a vehicle ID via a keypad dial 501. The keypad dial 501 could be on a personal electronic device, such as a smart phone, for example. In another embodiment, the keypad dial 501 is part of one or more reporting sources 308 of FIG. 3A. In one embodiment, the keypad dial 501 is part of asset mountable/detachable device 315 of FIG. 3A. In this embodiment, the keypad 501 is used by the driver of the vehicle to enter a user ID which is then used to associate the driver with the vehicle.

The data entered via the keypad 501 can be sent to the asset management system 400 of FIG. 4 in any number of ways. For example, the data could be sent as a text message over the cellular network. In another embodiment, the data could be sent as an email.

For example, a user or driver of a vehicle enters a user ID and/or a vehicle ID via an email/sms 503. An email/sms 503 could be sent from a personal electronic device, such as a smart phone, for example. In another embodiment, an email/sms 503 can be sent from any of the reporting sources 308 of FIG. 3A. In one embodiment, the email/sms 503 sent from the asset mountable/detachable device 315 of FIG. 3A, which is installed in the vehicle. In this embodiment, email/sms 503 is sent by the driver of the vehicle to provide a user ID and/or vehicle ID to the asset management system of the present invention. The asset management system uses the information provided by the email/sms 503 to associate the driver with the vehicle.

In one embodiment, a user or driver of a vehicle enters a user ID and/or a vehicle ID via voice command 505. In this embodiment, the user or driver of the vehicle would speak their name, for example and the vehicle identification to system capable of voice recognition 505. The voice data 505 could be sent from a personal electronic device, such as a smart phone, for example. In another embodiment, the voice data can be sent from any of the reporting sources 308 of FIG. 3A. In one embodiment, the voice data is sent from the asset mountable/detachable device 315 of FIG. 3A, which is installed in the vehicle. In one embodiment, the voice data is spoken by the driver of the vehicle which provides a user ID and/or vehicle ID to the asset management system of the present invention. The asset management system uses the information provided by the voice data 505 to associate the driver with the vehicle.

In one embodiment, a user or driver of a vehicle provides a user ID and/or a vehicle ID via an image 507. In this embodiment, the user or driver of the vehicle would take a picture of the vehicle license plate, for example which could be used to uniquely identify the vehicle. It is appreciated that any number of images could be used to identify the driver and/or vehicle. For example, a picture of the vehicle identification number (VIN) could be taken and sent to the asset management system to enable vehicle identification.

In one embodiment, a dash mounted camera can be used to automatically capture an image of the driver. In this example, the camera can be configured to communicate with the portable electronic device associated with the driver, via Bluetooth, for example. An application on the user's phone can initiate communication with the camera and instruct the camera to automatically take and upload the image to the phone, where it can be sent to the asset management system. The camera can be identified as being associated with a particular asset, thereby directly associating the driver, by picture to the vehicle.

Once an image is captured, it could can sent to the asset management system in any number of ways. For example, the image could be sent as a picture message over the cellular network. In another embodiment, the image could be sent as an email attachment.

On the receiving side, the asset management system is able to identify the user, based on the serial number associated with device that took the image. In most instances, images taken by electronic devices are stamped with a date, time, GPS location, and in most cases a serial number of the device that took the image. This image data can be used to facilitate asset identification and/or driver identification which can be used to associate the driver to the vehicle.

In one embodiment, the image could be sent from a personal electronic device, such as a smart phone, for example. In this embodiment, the phone number of the smart phone can be used to uniquely identify the user.

In another embodiment, the voice data can be sent from any of the reporting sources 308 of FIG. 3A. In one embodiment, the voice data is sent from the asset mountable/detachable device 315 of FIG. 3A, which is installed in the vehicle. In this embodiment, the voice data is spoken by the driver of the vehicle which provides a user ID and/or vehicle ID to the asset management system of the present invention. The asset management system uses the information provided by the voice data 505 to associate the driver with the vehicle.

In one embodiment, a user or driver of a vehicle scans a barcode 509 to capture vehicle specific data and/or driver specific data. In this embodiment, the user or driver of the vehicle would scan a barcode attached to the vehicle, for example, which could be used to uniquely identify the vehicle. It is appreciated that a barcode could also be assigned to a driver and when using a vehicle, the driver would scan a barcode on a badge to provide driver identification. It is appreciated that any number of barcodes could be used to identify the driver and/or vehicle and it is appreciated that any number of ways of scanning a barcode could be used in accordance with the present invention.

In one embodiment, the barcode 509 is scanned using a personal electronic device, such as a smart phone. Once the barcode 509 is scanned, the data is sent to the asset management system 400 of FIG. 4 where the vehicle ID can be determined and the driver ID can be determined. Once the driver and vehicle ID are known, association between the driver and vehicle can be made.

Once the barcode 509 is scanned, it could be sent to the asset management system in any number of ways. For example, the scanned barcode data could be sent as a picture message over the cellular network. In another embodiment, the scanned barcode data could be sent as an email or SMS.

In addition to capturing user and/or vehicle id using data inputs 501, 503, 505, 507 and 509, embodiments of the present invention use position data, such as GPS data 550 to perform the association 570 of the present invention.

It is appreciated that numerous devices capable of capturing the data inputs 501, 503, 505, 507 and 509 are also enabled to determine position data, such as GPS coordinates 550. In this embodiment, GPS data 550 is also sent to the asset management system with the vehicle identifier and/or the user identifier. Using the GPS data 550, the vehicle ID and the user ID, the asset management system of the present invention can associate vehicle activity to a particular driver. In one embodiment of the invention, the GPS data 550, the vehicle ID and the user ID are sent to the asset management system using a personal electronic device associated with the driver of the vehicle.

Since most people carry their personal electronic devices close to them, it can be assumed that the position of the personal electronic device of a driver is closely associated with the position of the vehicle. Hence, monitoring the activity or position of the personal electronic device enables effective position monitoring of a vehicle. Additionally, since personal electronic devices can be uniquely identified and can be uniquely associated with a person, the identity of a person can be determined when data is received from such a device.

Example Rout Track

Figure 6:
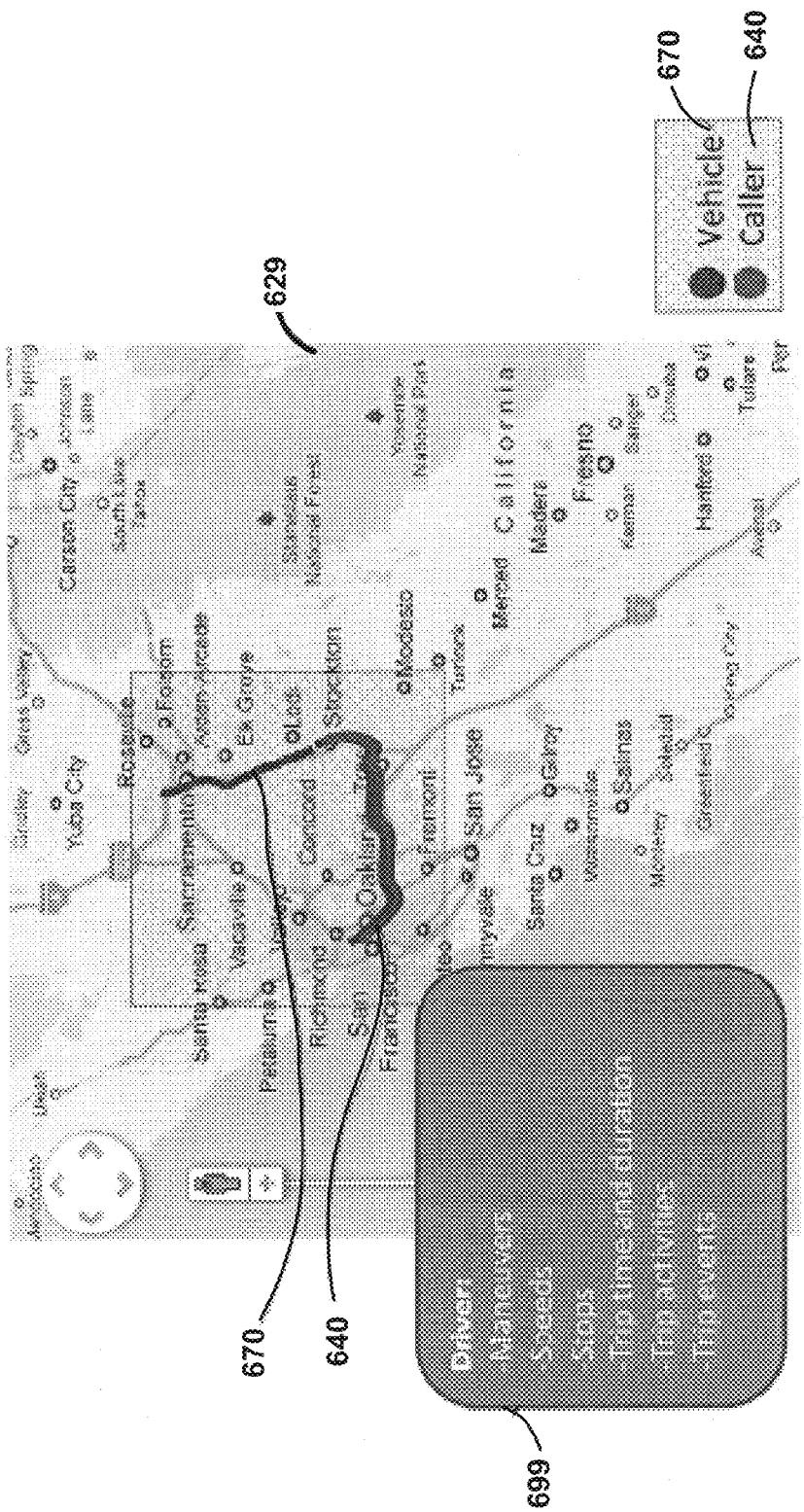
FIG. 6 depicts a route of a vehicle and a caller, according to an embodiment of the present invention.

FIG. 6 depicts a route of a vehicle 670 and a route of a caller 640, according to an embodiment of the present invention. As described above, the route of a vehicle 670 closely approximates the route of a caller 640, assuming the caller is the driver of the vehicle. According to the map 629, the path of the caller 640 appears to closely match the route of the vehicle 670. This relationship between the caller and the vehicle can be used to monitor the driver's activities 699 such as speed, route, maneuvers, trip metrics such as time in the car, miles driven, etc.

Example Methods of Vehicle to User Association

FIG. 7 is a block diagram of an exemplary method 700 for associating a user with an asset using position data, according to an embodiment of the present invention. Method 700 includes receiving 702 information from a remote reporting device in close proximity to an asset, the information including a first unique identifier associated with the asset and a second unique identifier associated with a user of the asset. In one embodiment, the second unique identifier associated with a user of the asset is identified from a personal; electronic device associated with the user.

Method 700 further includes associating 704 the asset with the user based on the information and monitoring 706 use of said asset and maintaining a record of said use by said user based on said information. In step 708, when the information received in 702 includes position information associated with a reporting device, method 700 further includes determining the position of the asset based on the position of the reporting device.

As provided above, the information received in 702 could be received from any reporting source 308 of FIGS. 3A and 3B and can be entered using one or more data inputs 501, 503, 505, 507 or 509 of FIG. 5. Additionally, signal analysis, such as Bluetooth frequency identification could also be used to determine a unique identifier of the user.

FIG. 8 is a block diagram of an exemplary method 800 for prompting a user to enter vehicle specific information to enable association of the user with the vehicle according to an embodiment of the present invention. Method 800 includes identifying 802 a telephone number associated with a portable electronic device, the portable electronic device associated with a user. In one embodiment, 802 includes a user calling from a personal electronic device to a centralized asset management system. Once communication is established between the personal electronic device and the asset management system, method 800 further includes prompting 804 the user of the portable electronic device to submit a unique identifier associated with the asset. For example, a user calls the centralized asset management system and is prompted to enter a vehicle ID.

Method 800 further includes automatically associating 806 the asset with the user based on the identified telephone number of the portable electronic device and based on the unique identifier associated with the asset.

In one embodiment, the unique identifier associated with the asset is a vehicle license number.

In another embodiment, the prompting is performed by generating a text message to the user at the personal electronic device. The user can then reply text with the vehicle ID.

FIG. 9 is a block diagram of an exemplary method 900 for receiving data from a personal electronic device associated with a user to enable association of the user with a vehicle according to an embodiment of the present invention. The method 900 includes receiving 902 data from a portable electronic device associated with a user, the data including a unique identifier associated with the asset. In one embodiment, the identifier is received as a picture, a text message, an email message, as voice data, a barcode, or any other electronic transmission from a portable electronic device.

Method 900 further includes identifying 904 a telephone number associated with the portable electronic device and determining 906 an identity of the user based on the telephone number associated with the portable electronic device. The method 900 further includes automatically associating the asset with the user based on the identity of the user and based on the unique identifier associated with the asset.

As mentioned above, in one embodiment, a user sends a picture of a recognizable portion of the vehicle such as the license plate or a vehicle identification number. In one embodiment of the invention, method 900 further includes parsing the unique identifier from the image.

FIG. 10 is a block diagram of an exemplary method 1000 for using an on-board tracking system of a vehicle to receive data from a personal electronic device associated with a user to enable association of the user with a vehicle according to an embodiment of the present invention. Method 1000 includes prompting 1002 a user of an asset to provide a unique identifier associated with the user. In one embodiment, the user initiates connection between a centralized asset management system and a personal electronic device. The user can provide the unique identifier associated with the user to the asset management system in any number of ways, including any data inputs described in association with FIG. 5. In one embodiment, the unique identifier associated with the user is provided as a voice input from the user. In another embodiment, the unique identifier associated with the user is provided in a test or SMS message sent from the user's personal electronic device.

At 1004, method 1000 includes receiving data from the user indicating the unique identifier associated with the user. At 1004, the asset management system of the present invention receives the unique identifier associated with the user. In one embodiment, the data received in 1004 is sent from a personal electronic device associated with the user. In another embodiment, the data received in 1004 is sent from a tracking device installed in a vehicle.

At 1006, method 1000 includes determining a unique identifier associated with the asset. In one embodiment, the unique identifier associated with the asset could be a license plate number, a vehicle identification number or any other unique identifier associated with the vehicle.

At 1008, method 1000 includes associating the asset with the user based on the unique identifier associated with the user and based on the unique identifier associated with the asset. In one embodiment, the association is performed by a centralized asset management system, such as system 400 of FIG. 4.

At 1010, method 1000 includes monitoring use of the asset by the user and maintaining a record of the use based on the monitoring. In one embodiment, the personal electronic device associated with the user periodically sends position information of the device to the asset management system. In this sense, the location of the personal electronic device can be used to track and monitor the position and/or activities of the user in the vehicle.

In one embodiment of the invention, a user can perform dissociation with the asset by sending a dissociation request to the asset management system. In one embodiment, the asset management system performs the dissociation automatically. For example, an association can have a lifespan that expires automatically after a period of time.

Embodiments of the present invention, an improved position determination system and method, are thus described. While the present invention has been described in particular embodiments, it should be appreciated that the present invention should not be construed as limited by such embodiments, but rather construed according to the following claims.

What is claimed is:

1. A method for managing vehicles, the method comprising:
   receiving, at a computer system from a portable electronic device in close proximity to a vehicle in real time, a first unique identifier of the vehicle, said portable electronic device having a second unique identifier associated with a user of the portable electronic device, wherein the first unique identifier of the vehicle is submitted by the user via the portable electronic device;
   associating, at said computer system, the vehicle with said user based on said first unique identifier of the vehicle, said second unique identifier associated with the user, and the close proximity of the vehicle with the portable electronic device in real time;
   receiving, at said computer system, position information of the portable electronic device from a position sensor attached to the portable electronic device;
   determining, at said computer system, position information of the vehicle based on the position information of the portable electronic device and the close proximity of the vehicle with the portable electronic device in real time; and
   monitoring, at said computer system, use of said vehicle and maintaining a record of said use by said user based on said position information of said vehicle.

2. The method of claim 1 wherein said monitoring includes receiving status information associated with the vehicle.

3. The method of claim 1 wherein the first unique identifier of the vehicle includes a license plate number of the vehicle.

4. The method of claim 1 wherein the first unique identifier of the vehicle is received as a text message from the portable electronic device, the text message submitted by the user.

5. The method of claim 1 wherein the first unique identifier of the vehicle is received as an image including a license plate number or a vehicle identification number (VIN) of the vehicle.

6. The method of claim 1 wherein the first unique identifier of the vehicle includes a barcode associated with the vehicle.

7. The method of claim 1 wherein the first unique identifier of the vehicle includes voice data generated by said user.

8. The method of claim 1 wherein the first unique identifier of the vehicle includes alphanumeric data generated by said user.

9. A system for managing a vehicle, the system comprising:
   a receiver configured to receive from a portable electronic device in close proximity to the vehicle in real time a first unique identifier of the vehicle, said portable electronic device having a second unique identifier associated with a user of the portable electronic device, wherein the first unique identifier of the vehicle is submitted by the user via the portable electronic device;
   a vehicle management module coupled with said receiver, the vehicle management module configured to:
      associate the vehicle with said user based on said first unique identifier of the vehicle, said second unique identifier associated with the user, and the close proximity of the vehicle with the portable electronic device in real time;
      receive position information of the portable electronic device from a position sensor attached to the portable electronic device;
      determine position information of the vehicle based on the position information of the portable electronic device and the close proximity of the vehicle with the portable electronic device in real time;
      monitor use of the vehicle based on the position information of the vehicle; and
   a database coupled with the vehicle management module and configured to maintain a record of said use.

10. The system of claim 9 wherein the first unique identifier of the vehicle includes a license plate number of the vehicle.

11. The system of claim 9 wherein the first unique identifier of the vehicle is received as a text message from the portable electronic device, the text message submitted by the user.

12. The system of claim 9 wherein the first unique identifier of the vehicle is received as an image including a license plate number or vehicle identification number (VIN) of the vehicle.

13. The system of claim 9 wherein the first unique identifier of the vehicle includes a barcode associated with the vehicle.

14. The system of claim 9 wherein the first unique identifier of the vehicle includes voice data generated by the user.

15. The system of claim 9 wherein the first unique identifier of the vehicle includes alphanumeric data generated by said user.

16. A method for tracking a vehicle, the method comprising:
   receiving a phone call from a portable electronic device;
   identifying with a caller identification system a telephone number associated with the portable electronic device;
   associating the portable electronic device with a user of the portable electronic device based on the telephone number;
   prompting said user of said portable electronic device to submit a unique identifier associated with the vehicle that is in close proximity with the portable electronic device in real time;
   receiving from the user through the portable electronic device the unique identifier associated with the vehicle;
   associating the user with the vehicle based on the unique identifier associated with the vehicle, the telephone number, and the close proximity of the vehicle with the portable electronic device in real time;
   receiving position information of said portable electronic device from a position sensor attached to said portable electronic device; and
   determining position information of the vehicle based on the position information of the portable electronic device and the close proximity of the vehicle with the portable electronic device in real time.

17. The method of claim 16 wherein said unique identifier associated with the vehicle is a vehicle license number.

18. The method of claim 16 wherein said prompting is performed by generating audible instructions.

19. The method of claim 16 wherein said prompting is performed by generating a text message.

20. A method for tracking a vehicle, the method comprising:
   receiving, at a computer system from a portable electronic device associated with a user, a unique identifier of the vehicle that is in close proximity with the portable electronic device in real time;
   identifying a telephone number associated with said portable electronic device;
   determining an identity of said user based on said telephone number;
   associating the vehicle with said user based on said identity of said user, said unique identifier of the vehicle, and the close proximity of the vehicle with the portable electronic device in real time and
   monitoring the position of the vehicle by monitoring the position of the portable electronic device through a position sensor attached to the portable electronic device.

21. The method of claim 20 wherein the unique identifier of the vehicle includes a text message.

22. The method of claim 20 wherein said unique identifier is received as an image.

23. The method of claim 22 further comprising:
   parsing said unique identifier from said image.

24. The method of claim 20 wherein said unique identifier is received as a text message.

25. The method of claim 24 further comprising:
   parsing said unique identifier from said text message.

* * * * *